United States Patent [19]

Ortega

[11] 4,339,110
[45] Jul. 13, 1982

[54] BUTTERFLY VALVE

[75] Inventor: Robert Ortega, Rancho Mirage, Calif.

[73] Assignee: Purex Corporation, Lakewood, Calif.

[21] Appl. No.: 203,414

[22] Filed: Nov. 3, 1980

Related U.S. Application Data

[63] Continuation-in-part of Ser. No. 116,033, Jan. 28, 1980, Pat. No. 4,278,109.

[51] Int. Cl.³ .............................................. F16K 5/04
[52] U.S. Cl. .................... 251/309; 251/312; 251/DIG. 1
[58] Field of Search .................. 137/625.32; 251/306, 251/309, 312, 305, DIG. 1

[56] References Cited

U.S. PATENT DOCUMENTS

| | | | |
|---|---|---|---|
| 299,734 | 6/1884 | Callahan | 251/306 |
| 1,333,048 | 3/1920 | Webster | 137/625.32 |
| 2,817,489 | 12/1957 | Hesmer | 251/305 |
| 3,938,553 | 2/1976 | Ortega | 251/DIG. 1 |

FOREIGN PATENT DOCUMENTS

522466 4/1955 Italy ................................ 251/309

Primary Examiner—Arnold Rosenthal
Attorney, Agent, or Firm—William W. Haefliger

[57] ABSTRACT

A butterfly valve comprises:
(a) a valve body having a generally cylindrical cavity defining a longitudinal axis, the body having first and second ports communicating with the cavity,
(b) a rotary valve member in the cavity, and having a generally cylindrical exterior surface and a side opening therethrough generally normal to that axis,
(c) the valve member having a butterfly closure that extends crosswise of the side opening,
(d) the valve member having an open position in which the side opening is in alignment with such ports with the butterfly closure in edgewise flow passing alignment with the ports to pass fluid flow through the side opening, and the valve member having a close position in which the side opening is also in alignment with such ports but with the butterfly closure in flow blocking relation to the ports to block fluid flow through the side opening.

1 Claim, 4 Drawing Figures

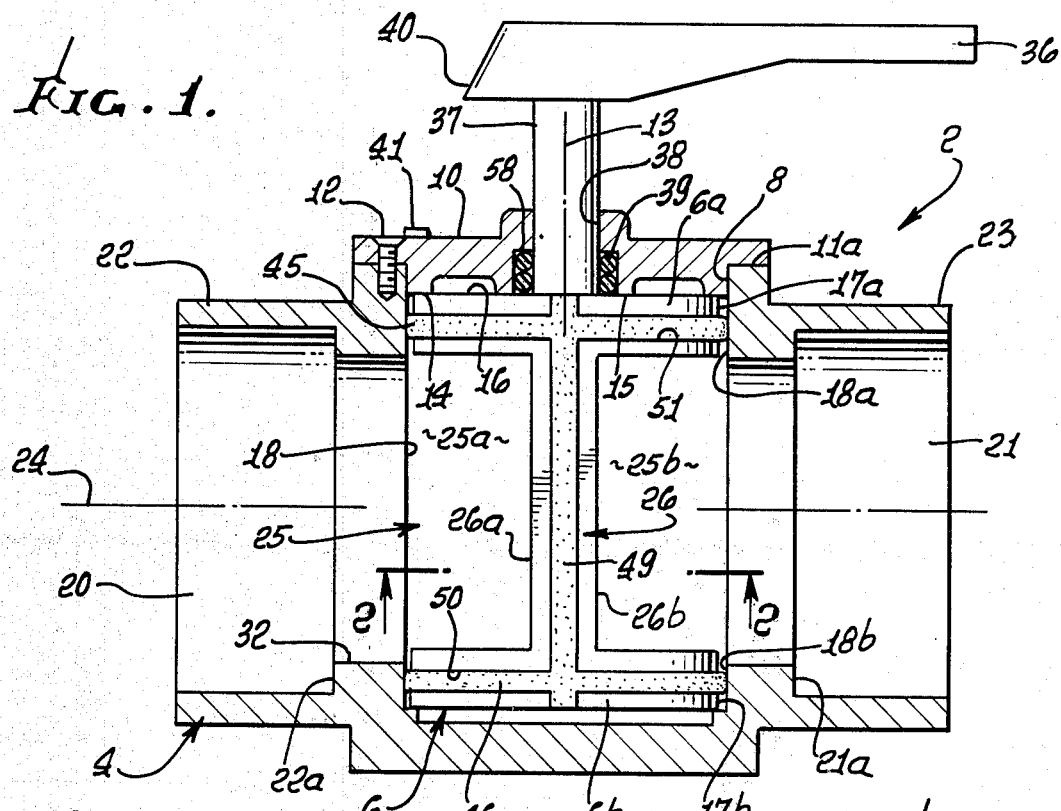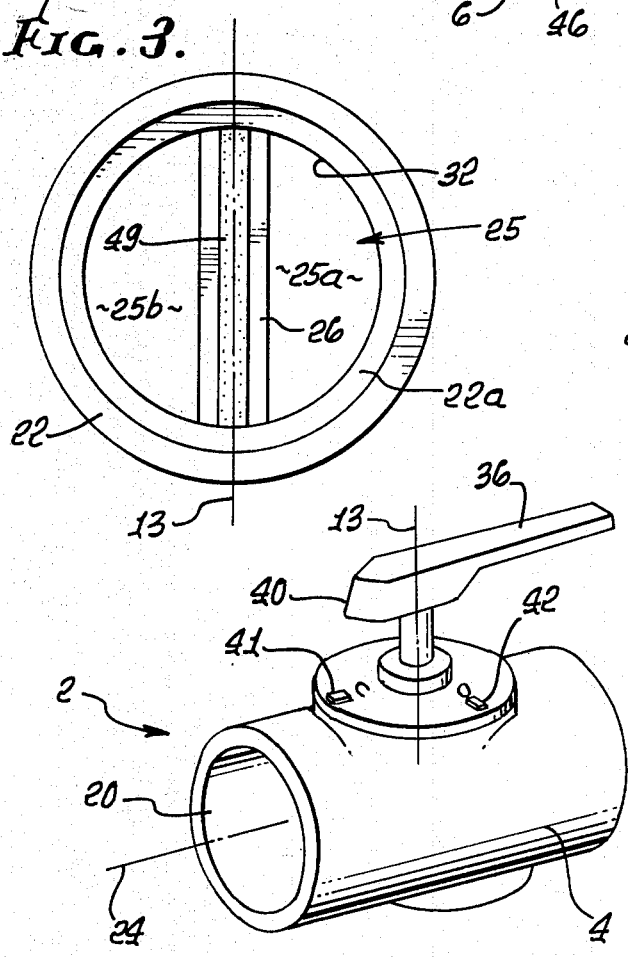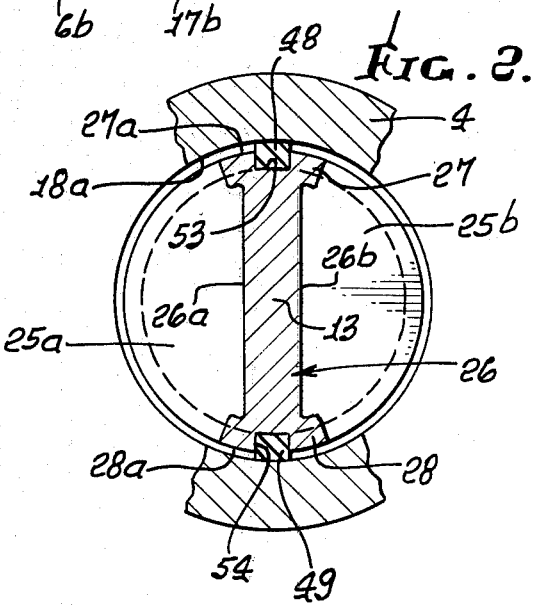

BUTTERFLY VALVE

BACKGROUND OF THE INVENTION

This application is a continuation-in-part of my prior application Ser. No. 116,033, filed Jan. 28, 1980, now U.S. Pat. No. 4,278,109, dated July 14, 1981.

This invention relates generally to valves, and more particularly concerns a lightweight valve having a cylindrical rotary valve member, and is especially adapted for use in swimming pool plumbing control systems, as well as other systems.

U.S. Pat. No. 3,938,553, now U.S. Pat. No. Re. 30,228, discloses a valve having three body openings, and a cylindrical rotary valve member movable between positions in which flow control is effected between pairs of the openings, there being flow through the valve in all positions of the rotary member. There is need for a simple and effective valve likewise having a cylindrical rotary valve member, which is capable of completely shutting off the flow in one position of the rotary member, i.e. having ON-OFF modes of operation.

SUMMARY OF THE INVENTION

It is a major object of the invention to provide an improved lightweight valve meeting the above need. Basically, the valve is characterized as of butterfly type, and includes:

(a) a valve body having a generally cylindrical cavity defining a longitudinal axis, the body having first and second ports communicating with said cavity, (b) a rotary valve member in said cavity, said member having a generally cylindrical exterior surface and a side opening therethrough generally normal to said axis, (c) the valve member having a butterfly closure that extends crosswise of said side opening, (d) the valve member having an open position in which said side opening is in alignment with said ports with said butterfly closure in edgewise flow passing alignment with said ports to pass fluid flow through said side opening, and the valve member having a closed position in which said side opening is also in alignment with said ports but with said butterfly closure in flow blocking relation to said ports to block fluid flow through said side opening.

As will appear, the valve member typically includes upper and lower circular or disc-like sections which are axially spaced apart, the member having longitudinally extending legs interconnecting those sections, with the butterfly closure located between those legs and having generally planar shape. Its location is such as to bisect the flow path through the valve in "open" condition, whereby balanced operation is achieved, as benefits the sealing arrangement. The latter includes seal means sealing off between the valve member and body cavity wall, and particularly about the two axially spaced sections of the rotary valve member, and along the legs interconnecting them. The seal means may include rings and branches located in grooving in the rotary valve member, as will be seen, with unusual advantages as will appear.

These and other objects and advantages of the invention, as well as the details of an illustrative embodiment, will be more fully understood from the following description and drawings, in which:

DRAWING DESCRIPTION

FIG. 1 is a side elevation, in showing a butterfly valve incorporating the invention, the valve being closed;

FIG. 2 is a section in plan view taken on lines 2—2 of FIG. 1; and

FIG. 3 is an end view of the FIG. 1 valve when in open condition; and

FIG. 4 is a perspective view of the valve of FIGS. 1–3.

DETAILED DESCRIPTION

In FIG. 1, a valve 2 includes a valve body, with a rotary valve member 6 retained within the body. The valve member which is of generally cylindrical construction, may be inserted within the body 4 through a valve body opening 8. After insertion within the body 4, the member 6 is retained in position by a removable closure 10. The closure or cap is secured in position against end 11a of body annular boss 11 as by fasteners 12 spaced about the longitudinal axis 13 of rotation of member 6. Note that inner surfaces 14 and 15 of cap 10 slidably engage the end face 16 of the member 6.

The valve member 6 is located within a cylindrical cavity in the body, and the member has a generally cylindrical surface engaging the cavity wall. In the example, the member 6 includes upper and lower circular sections 6a and 6b which are axially spaced apart. Section 6a has a cylindrical surface 17a loosely interfitting the body cavity cylindrical wall at 18a; and lower section 6b has a cylindrical surface 17b loosely interfitting the cavity cylindrical wall at 18b.

The body member 4 is seen to have first and second ports 20 and 21 formed by laterally oppositely extending tubular portions 22 and 23, the ports having a common lateral axis 24. Tubular ports 20 and 21 are adapted to receive pipe sections, not shown, to seat endwise at steps 21a and 22a. Ports 20 and 21 are thus at laterally opposite sides of the body cylindrical cavity 18, and communicate with a side opening 25 that extends laterally through the valve member, in two sections 25a and 25b. Those sections are at opposite sides of a butterfly closure 26 that extends crosswise of the side opening. Closure 26 may be integral with the remainder of the valve member, and is shown as integral with upper and lower sections 6a and 6b to interconnect them. Note also that the valve member 6 has legs 27 and 28 which extend generally longitudinally, and interconnect the sections 6a and 6b, the legs confining the closure 26 between them, as is clear from FIG. 2, and also having cylindrical surfaces at 27a and 28a loosely interfitting the body cavity wall as at 18a.

The valve member has an open position (FIG. 3, for example) in which the side opening 25 is in alignment with the ports 20 and 21, with the butterfly closure 26 then in edgewise flow passing alignment with the ports to pass fluid flow through the valve via the side opening sections 25a and 25b. Note that the butterfly closure in FIG. 3 edgewise subtends only a small portion (less than 25%) of the total circular space defined by body opening 32.

The valve member also has a closed position (see FIG. 2, for example) in which the side opening 25 is also in alignment with the ports (i.e. side opening section 25a aligns with port 21, and section 25b aligns with port 20); but, in this mode the butterfly closure 26 is in flow blocking relation with the ports, to block flow through the side opening 25 and through the valve. In this mode, the butterfly closure side walls 26a and 26b face the respective ports 21 and 20. Note that the closure is generally planar, and rectangular in outline.

Valve handle 36 is connected via stem 37 with the body 6. The stem extends through a bore 38 in the cap 10, coaxially with axis 13. O-ring seals 58 in cap recess 39 seal off against the stem. A pointer 40 on the stem points to a "closed" indicator 41 on the cap in FIGS. 1 and 4, and is rotatable 90° to point to an OPEN indicator 42 on the cap, at which time closure 26 is in FIG. 3 position.

Means is provided to seal off between the valve member and the valve body, and about the sections 6a and 6b, and along the legs 27 and 28. In this regard, and as shown, the seal means is shown to include first and second rings 45 and 46 about the body sections 6a and 6b, and two like branches 48 and 49 extending longitudinally in association with the valve member legs 27 and 28, and integrally interconnecting said rings. Thus, the rings and branches may consist of elastomeric material such as rubber, whereas the valve body 4 and rotary valve member 6 may consist of molded plastic material.

The valve member contains grooving receiving the seal means about the sections 6a and 6b and along the legs 27 and 28. Such grooving includes ring grooves 50 and 51, and longitudinally elongated grooves 53 and 54. The depths of the grooves are slightly less than the corresponding depth or thickness dimensions of the seal rings and branches, whereby the seal means everywhere projects slightly from the grooves to sealingly engage, with pressure, the body cavity wall 18a. In FIG. 3, the seal branches 48 and 49 are exposed toward the ports 21 and 20, respectively.

Finally, note that the lower side of the body is closed at 60, that closure being integral with the body or comprising another cap.

Advantages include the following:
(a) Simplicity of the butterfly type valve;
(b) Effective sealing, using two seal rings and two branches;
(c) Ease of installation of the seal on the cylindrical rotary valve member; and
(d) Ease of removal of the valve member from the valve body, as for example replacement of the seal;
(e) Long life of all components;
(f) Low cost.

I claim:
1. A butterfly valve, that comprises
(a) a valve body having a generally cylindrical cavity defining a longitudinal axis, the body having first and second ports communicating with said cavity,
(b) a rotary valve member in said cavity, said member having a generally cylindrical exterior surface and a side opening therethrough generally normal to said axis,
(c) the valve member having a butterfly closure that extends crosswise of said side opening,
(d) the valve member having an open position in which said side opening is in alignment with said ports with said butterfly closure in edgewise flow passing alignment with said ports to pass fluid flow through said side opening, and the valve member having a closed position in which said side opening is also in alignment with said ports but with said butterfly closure in flow blocking relation to said ports to block fluid flow through said side opening,
(e) said valve member including upper and lower circular sections which are axially spaced apart, the member having legs interconnecting said sections, said closure extending between said legs, said legs extending longitudinally at diametrically opposite sides of said valve member,
(f) and seal means sealing off between said valve member and said valve body and about said sections and along said legs, the valve member containing grooving receiving said seal means about said sections and along said legs, the seal means including first and second rings about said sections and longitudinal branches interconnecting said rings, said rings and branches having generally rectangular cross sections, the branches associated with said legs, the rings received in grooves in said sections but projecting therefrom and the branches received in grooves in said legs but projecting therefrom,
(g) said valve body having longitudinally spaced first and second ends, there being a valve handle proximate one of said ends, and longitudinally extending stem interconnecting said handle with one of said sections, the stem extending through said first end of the valve body, said first end including a cap in slidable engagement with one of said sections in axially spaced relation to the ring associated with said section,
(h) said legs having widths greater than the thickness of said closure, and the legs projecting widthwise beyond planes defined by opposite faces of the closure.

* * * * *